United States Patent Office 3,794,586
Patented Feb. 26, 1974

3,794,586
LUBRICATING OIL COMPOSITION
Shoji Kimura, Chigasaki, and Noboru Ishida, Sagamihara, Japan, assignors to Nippon Oil Co., Ltd., Tokyo, Japan
No Drawing. Filed Mar. 13, 1972, Ser. No. 234,400
Claims priority, application Japan, Mar. 18, 1971, 46/14,891
Int. Cl. C10m 1/32, 1/34
U.S. Cl. 252—51.5 R
9 Claims

ABSTRACT OF THE DISCLOSURE

A lubricating oil composition which is characterized by containing hydroxyalkyl-substituted polyamine prepared by reacting a polyolefin epoxide represented by the general formula

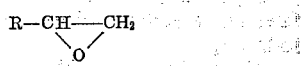

where R designates a branched-chain alkyl group having average molecular weight of 140 to 3000, with a polyamine selected from the group comprising alkylene-diamine, cycloalkylene-diamine, aralkyl-diamine, polyalkylene-polyamine and aromatic diamine at a temperature of 15 to 180° C.

---

The present invention relates to a lubricating oil composition in which the oxidation-stability and the cleaning-dispersing properties are improved by addition of hydroxy-alkyl-substituted polyamine prepared by reacting an alkylene epoxide with a polyamine.

It is well known that lubricating oils employed for general industrial machines contain an antioxidant in order to lengthen usable life. For such purpose, phenols and aromatic amines are usually employed. It is well known that lubricating oils for internal combustion engines contain a cleaning agent in order to prevent corrosion of the engine, abrasion of the cylinder and formation of sludge and varnish in the motoritive parts. The cleaning agents so far employed are metallic sulfonate, metallic phenate, metallic phosphonate and other metal-containing compounds. Such metal-containing cleaning agents exhibit great efficiency against sludge formation at higher temperatures. But they are insufficient for preventing low-temperature sludge which is apt to be formed in the serious conditions at lower temperatures, given by a recent stop-and-go driving. In recent times, a so-called ashless cleaning agent is often employed alone or in combination with the metal-containing cleaning agent. A cleaning agent containing alkenyl succinimide is the typical of such a class. The hydroxyalkyl substituted polyamine of the present invention is entirely different from such known types of ashless cleaning agent in chemical structure. Its addition to the base oil at a proportion of 0.01–20% by weight gives a new lubricating oil composition with excellent oxidation-stability and cleaning-dispersing properties.

The present invention relates to a lubricating oil composition characterized by containing a reaction product of the reaction between a polyolefin epoxide represented by the general formula

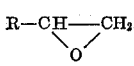

where R designates a branched-chain alkyl group having average molecular weight of 140–3000, and an amine compound selected from the group comprising alkylene-diamine, cycloalkylene-diamine, aralkyl-diamine, polyalkylene-polyamine and aromatic diamine at a temperature of 15–180° C.

The reaction between the polyolefin epoxide, e.g. polypropenyl epoxide, polybutenyl epoxide and others, and the polyamine selected from the group comprising alkylene-diamine, cycloalkylene-diamine, aralkyl-diamine, polyalkylene-polyamine and aromatic diamine is represented by the following scheme, where the molecular structure of the resultant hydroxyalkyl-substituted polyamine is also shown.

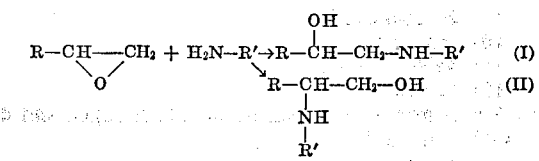

where R designates a branched-chain alkyl group with average molecular weight of 140–3000. Material having an R whose molecular weight is below 140 is difficult to manufacture industrially and those where R has a molecular weight above 3000 is not desirable because it gives too high a viscosity and it is practically useless.

R′ designates the residual group attached to one of the amino groups included in polyamine molecule, which is derived from alkylene-diamine, cycloalkylene-diamine, aralkylene-diamine, polyalkylene-polyamine or aromatic diamine.

The detail of the present invention will be mentioned below. Hydroxyalkyl-substituted polyamine is prepared by the following manner.

A polyolefin which is the origin of alkenyl substituent, is obtained in the form of a polymer attached to carbon-carbon double bond at the terminal point of molecule by polymerizing a monoolefin, e.g. ethylene, propylene, butylene, and so on. The resultant polymer is oxidized with various oxidizing agents to give an alkylene oxide of which the terminal oxirane ring is derived from oxidation in the terminal double bond.

The oxidizing agent to be employed is exemplified by hydrogen peroxide, per-acetic acid, per-benzoic acid, per-formic acid, mono-perphthalic acid, per-camphoric acid, per-succinic acid and per-trifluoracetic acid. Preferably per-acetic acid is used.

When per-acetic acid is employed, its 40% acetic solution and 1/20 equivalent of sodium acetate (as compared with per-acetic acid) are added to the olefin (per-acid: olefin=120:100 in mole) and the mixture is gradually allowed to react at a temperature of 20–30° C.

The resultant alkylene epoxide is a liquid or semi-solid resin at ordinary temperature in accordance with the species and molecular weight of olefin employed. Generally it assumes a light yellow color. The oxygen content agrees well with the calculated theoretical value. The resultant alkylene epoxide is very reactive and readily reacts with a polyamine at an appropriate molar ratio by heating the mixture to 15–180° C. in the absence of oxygen, with constant stirring, generally in the absence of catalyst, either in the presence or absence of solvent, for several hours. At a temperature below 15° C. the reaction is too slow. Above 180° C. several secondary reactions take place and the yield is lowered. Before the reaction, the components are mutually insoluble, so that the contents of the flask are heterogeneous and opaque. It gradually becomes homogeneous and transparent in accordance with the progress of reaction, which permits a rough estimation of the conversion. The completion of the reaction is ascertained by observing the disappearance of amino and epoxy bands and the appearance of the hydroxy band in the IR spectrum. In the reaction between alkylene oxide and polyamine, if an excess amount of the former is employed, two or more amino groups of the polyamine molecule can be reacted with the epoxide.

The polyamines suitable for this invention are: alkylene-diamine, cyclo-alkylene-diamine, aralkylene-diamine, polyalkylene-polyamine, amino-alkylpiperadine and aromatic diamine. In detail, alkylene-diamine is represented by the formula

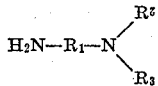

where $R_1$ is a $C_2$–$C_{20}$ alkylene group and $R_2$, $R_3$ are hydrogen atom or a $C_1$–$C_3$ alkyl group. Such alkylene-diamine is exemplified by: ethylene-diamine, propylene-diamine, butylene-diamine, octylene-diamine, tetradecylene-diamine, octadecylene-diamine, dimethylaminoethylamine, dimethylaminopropylamine, diethylaminopropylamine, diethylaminobutylamine, and dipropylaminobutylamine.

The cycloalkylene-diamine suitable for the invention is represented by the general formula

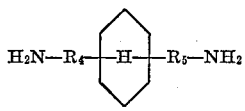

where $R_4$ and $R_5$ are $C_1$–$C_5$ straight-chain hydrocarbon groups or, in some cases, $R_4$ and $R_5$ may be omitted. Compounds of this formula are exemplified by 1,3-diaminocyclohexane, 1,4-diaminocyclohexane and 1,4-bis (aminomethyl)-cyclohexane.

The aralkylene-diamine suitable for the invention is represented by the general formula

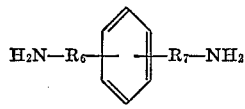

where $R_6$ and $R_7$ designate $C_1$–$C_5$ divalent straight-chain hydrocarbon groups. A compound of this formula is exemplified by 2,4-bis($\beta$-amino-t-butyl)-toluene.

The polyalkylene-polyamine suitable for the invention is represented by the general formula

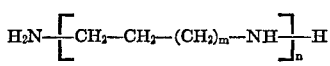

where $m$ is zero or one and $n$ is 2–11. Compounds of this formula are exemplified by diethylene-triamine, dipropylene-triamine, triethylene-tetramine, tetraethylene-pentamine, pentaethylene-hexamine, and 1,1-ethylene-decamine.

The polyalkylene-polyamine suitable for the invention also includes aminoalkylpiperadine represented by the general formula

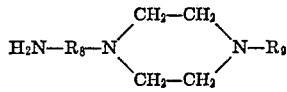

where $R_8$ is a $C_1$–$C_3$ alkylene group and $R_9$ is hydrogen or a $C_1$–$C_3$ alkyl group. A compound of this formula is exemplified by N-($\beta$-aminoethyl)-piperadine.

The aromatic diamines suitable for the invention are m- and p-phenylenediamine, 2,2-bis(4,4-diaminodiphenyl)-propane, 4,4' - diaminodiphenylmethane, benzidine, 4,4'-diaminodiphenylether, 3,3'- and 4,4'-diaminodiphenyl sulfide, 4,4'-diaminodiphenylsulfone, 1,5-diaminonaphthalene, 3,3'-diamethyl-4,4'-diaminobiphenyl and 3,3'-diamethoxybenzidine.

The hydroxyalkyl-substituted polyamine prepared in the described manner is utilized as such or in the form of a solution in a purified mineral oil (usually at a concentration of 30–40% by weight). The mineral oils to be employed for dissolving the hydroxyalkyl-substituted polyamine are: mineral lubricating oils, diester oil, long-chain alkyl-benzene oil, polyalkylnaphthalene oil, polyalkylene-oxide oil, polyphenyl oil and silicone oil.

The amount to be added to the lubricating oil is 0.01–20% by weight, preferably 0.1–8% by weight. A dose below 0.01% is insufficient in effectiveness and a dose above 20% is undesirable from an economical standpoint.

The composition of the invention may be employed in combination with lubricating oil additives, such as metal-containing cleaning agents (e.g. metal sulfonate), ashless cleaning agents (e.g. alkenylsuccinimide), antioxidants (e.g. metallic salt of dithiophosphoric acid, metallic salt of dialkyldithiocarbamic acid, 2,6-ditertiarybutyl-p-cresol, phenyl-d-naphthylamine, octadecylamine), V.I.-improving and pour-point-depressing agent (e.g. polybutene and polymethacrylate), various anti-corrosive agents and extreme-pressure additives.

The following examples will further illustrate the present invention but are not to be considered limitations thereupon.

EXAMPLES (Preparation of polyolefine epoxide)

Example 1.—In a vessel equipped with a cooler, heater and reflux condenser, 0.5 mole of polyisobutylene (M.W. 1260) and 500 ml. of n-hexane are stirred, and dropwisely a mixture of 0.6 mole of per-acetic acid (40% acetic acid solution) and 0.03 mole of sodium acetate is added. An exothermic reaction takes place. The inner temperature is maintained at 20–30° C. by regulating the dropping rate and cooling efficiently. After the dropping is completed, the contents all stirred for 4 hours more. Then n-hexane is removed by distillation and the residue is poured into 200 ml. of water, extracted several times with ether, washed with water and sodium carbonate and then dried. The dry solution, after being freed from ether by distillation, gives polyisobutylene epoxide. A faintly yellow semisolid which slowly flows at ordinary temperature. Its oxygen content is about one percent. The yield is about 85% by weight based on the isobutylene used.

Example 2.—In the same apparatus as used in Example 1, one mole of propylene-polymer (M.W. ca. 210) and 200 ml. of n-hexane are stirred, and 1.2 moles of per-acetic acid and 0.06 mole of sodium acetate are added. The mixture is treated similarly to Example 1 to give polypropylene epoxide. The product is faintly yellow liquid which flows at ordinary temperature. Its oxygen content is about 5.4%. The yield is about 85% by weight based on polypropylene polymer used.

(Preparation of hydroxyalkyl-substituted polyamine)

Example 3.—In a flask equipped with a reflux condenser, 130 g. of polyisobutylene epoxide (the product of Example 1), 19 g. of tetraethylene-pentamine and 500 ml. of toluene are placed. The mixture is heated to 110° C. in a dry stream of nitrogen with constant stirring. Then the toluene is removed by distillation. A yellow reaction product is obtained which flows slightly at ordinary temperature. The conversion is nearly 100% as proved by elemental analysis, molecular weight determination, IR spectroscopy and NMR-analysis.

Example 4.—In a flask equipped with a reflux condenser, 130 g. of polyisobutylene epoxide (the product of Example 1), 13 g. of 1-(2-aminoethyl)-piperadine and 500 ml. of toluene are placed and treated similarly to Example 3. The yield of reaction is near 100%. The product is semisolid which flows at ordinary temperature.

Example 5.—In a flask equipped with reflux condenser, 253 g. of polypropylene epoxide (the product of Example 2), 60 g. of ethylene-diamine and 300 ml. of toluene are placed. The mixture is heated to 110° C. for 4 hours with constant stirring under a stream of dry nitrogen. After removing the solvent by distillation, the product is obtained as the residual matter. The conversion is near 100%. The product is faintly yellow liquid which flows at ordinary temperature.

Example 6.—In a flask equipped with a reflux condenser, 253 g. of polypropylene epoxide (the product of Example 2), 114 g. of 1,3-diaminocyclohexane and 300 ml. of toluene are placed. The mixture is heated to 110° C. for 4 hours with constant stirring under a stream of dry nitrogen. After removing the solvent by distillation, the product is obtained. The conversion is near 100%. The product is faintly yellow liquid which flows at ordinary temperature.

Example 7.—In a flask equipped with a reflux condenser, 253 g. of polypropylene epoxide (the product of Example 2), 234 g. of 2,4-bis($\beta$-amino-t-butyl)-toluene and 500 ml. of toluene are placed. The mixture is heated to 110° C. for 4 hours with constant stirring under a dry stream of nitrogen. After removing the solvent by distillation, the product is obtained. The yield is near 100%. The product is yellow liquid which flows at ordinary temperature.

Example 8.—In a flask equipped with a reflux condenser, 253 g. of polypropylene epoxide (the product of Example 2), 198 g. of 4,4'-diaminodiphenylmethane and 500 ml. of toluene are placed. The mixture is heated to 110° C. for 4 hours with constant stirring under a dry stream of nitrogen. After removing the solvent by distillation, the product, which is yellow liquid flowing at ordinary temperature, is obtained with a yield of about 100%.

The composition of the invention containing hydroxyalkyl-substituted polyamine prepared as above and its actual employment will be illustrated by the following example.

(Preparation of the composition and evaluation of its cleaning power)

Example 9.—Hydroxyalkyl-substituted polyamines, prepared in the above-mentioned examples, are prepared into compositions according to the following recipes.

Composition A:

Substituted polyamine (Example 3) _____ 5% by weight.
Zinc dialkylthiophosphate __ 14 mmoles/l. (as Zn).
Polymethacrylate _____ 6% by weight.
Mineral oil lubricant (Middle East SAE 10) _____ The rest.

Composition B:

Substituted polyamine (Example 4) _____ 6% by weight.
Zn dialkylthiophosphate ___ 15 mmoles/l. (as Zn).
Polymethacrylate _____ 6% by weight.
Mineral oil lubricant (Middle East SAE 10) _____ The rest.

Compositions A and B are subjected to modified sequence V test in a Dutsun engine and the results are compared with those obtained with the lubricants (a) and (b) to which other types of cleaning agents are added. The results are listed in the following table.

THE OPERATING CONDITIONS IN THE MODIFIED SEQUENCE V TEST

| | Time | Speed (r.p.m.) | Aspirating pressure (mm. Hg) | Water, temp. at outlet (° C.) | Oil, temp. (° C.) | Air-fuel ratio |
|---|---|---|---|---|---|---|
| I | 1.0 | 600 | (¹) | 45 | 50 | 9.6±0.5 |
| II | 2.0 | 2,500 | 200 | 50 | 80 | 15.5±1.0 |
| III | 1.0 | 3,500 | 200 | 80 | 95 | 15.5±1.0 |

¹ No load.

The test is carried out for 48 cycles (192 hours) in total, one cycle being I→II→III.

RESULTS OF THE TEST

| | Examples of comparison | | Examples | |
| | Oil a | Oil b | Composition A | Composition B |
|---|---|---|---|---|
| Viscosity, cst.: | | | | |
| At 210° F | 11.17 | 12.11 | 11.64 | 11.14 |
| At 100° F | 70.38 | 75.40 | 74.13 | 70.78 |
| V.I. | 137 | 139.5 | 139.3 | 136.5 |
| Component of cleaning agent | (¹) | (²) | (³) | (⁴) |
| Other additives | (⁵) | (⁵) | (⁵) | (⁵) |
| Sludge evaluations: | | | | |
| Rocker arm assembly | 9.6 | 9.5 | 9.8 | 9.8 |
| Rocker arm cover | 3.5 | 4.0 | 8.4 | 7.8 |
| Bush rod cover | 7.6 | 9.0 | 10.0 | 9.5 |
| Timing gear cover | 7.5 | 9.0 | 10.0 | 9.0 |
| Bush rod chamber | 10.0 | 10.0 | 10.0 | 10.0 |
| Oil pan | 7.9 | 7.5 | 9.0 | 9.0 |
| Oil screen | 10.0 | 10.0 | 10.0 | 10.0 |
| Total | 56.1 | 59.0 | 67.2 | 65.1 |
| Average (total by 5/7) | 40.0 | 42.1 | 48.0 | 46.5 |
| Varnish evaluation: | | | | |
| Piston skirt | 7.0 | 9.0 | 9.0 | 9.0 |
| Choke of oil ring (percent) | 0 | 0 | 0 | 0 |

¹ Sulfonatephenate.
² Phosphonate.
³ Example 3.
⁴ Example 4.
⁵ Zn=dialkyldithiophosphate polymethacrylate.

In the evalutions, 10 means the highest grade. In the average, 50 means the highest grade.

These results obviously indicate the compositions A and B are superior to metal-containing cleaning agents such as sulfonate. No cylinder abrasion and corrosion take place with the former. The CLR engine test, which is an evaluation of the anticorrosive characteristics and high-temperature cleaning characteristics, also gives satisfactory results. The hydroxy-substituted polyamines of Examples 5–8 similarly evidence their own superior cleaning powers.

(Preparation of compositions and evaluation of the antioxidant properties)

Example 10.—Turbine oil as a base is mixed with 1.5% by weight of one of the following materials: substituted amines prepared in Examples 3, 4, 5, 6, 7 and 8, polybutenylsuccinimide-tetraethylenpentamine derivative and 2,6-di-t-butyl-p-cresol (DPBC) (the latter two are controls). The resultant mixtures are subjected to the "Continental Oxygen-Uptake Test." Thus, in a 100 ml. flask equipped with U-mercury manometer, 13 ml. of sample oil composed of the basic turbine oil and the respective additives is added, and gaseous oxygen is introduced up to about 60 mm. Hg. The contents are heated to 115° C. for desired period of time and the lowering of oxygen pressure is observed.

The general characteristics of turbine oil are

Sp. gr. 15/4° C. _____ 0.8681
V.I. _____ 105
Color (Union) _____ 1(−)
Pour point, ° C. _____ −12.5
Flash point (COC), ° C. _____ 214
Viscosity (Cst. at 100° F.) _____ 28.1

OBSERVED LOWERING OF OXYGEN PRESSURE (mm. Hg.)

| Antioxidant, duration (hr.) | Base oil | Example: Hydroxyalkyl-substituted polyamine | | | | | | Comparative example: 2,6-di-t-butyl-p-cresol (DBPC) |
| | | Ex. 3 | Ex. 4 | Ex. 5 | Ex. 6 | Ex. 7 | Ex. 8 | |
|---|---|---|---|---|---|---|---|---|
| 0 | 0 | 0 | 0 | 0 | 0 | 0 | 0 | 0 |
| 250 | 87 | 5 | 7 | 12 | 19 | 5 | 0 | 2 |
| 500 | 150 | 10 | 12 | 20 | 25 | 17 | 8 | 5 |
| 1,000 | 300 | 32 | 46 | 68 | 80 | 60 | 28 | 270 |

What is claimed is:

1. A lubricating oil composition consisting essentially of lubricating oil, and as a detergent and antioxidant therefor, a hydroxyalkyl-substituted polyamine prepared by reacting polyolefin epoxide represented by the general formula

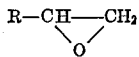

where R designates branched-chain alkyl group having average molecular weight of 140 to 3000, with polyamine selected from the group consisting of alkylene-diamine, cycloalkylene-diamine, aralkylene-diamine, polyalkylene-polyamine and aromatic diamine at a temperature of 15 to 180° C.

2. A lubricating oil composition according to claim 1 in which said hydroxyalkyl-substituted polyamine is contained in the range of 0.01–20 percent by weight to the base oil.

3. A lubricating oil composition according to claim 1 in which said hydroxyalkyl-substituted polyamine is contained in the range of 0.1–8%.

4. A lubricating oil composition according to claim 2 wherein said alkylene-diamine is of the formula

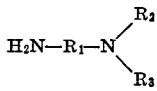

wherein $R_1$ is a 2–20 carbon atom alkylene group and $R_2$ and $R_3$ are hydrogen or a 1–3 carbon atom alkyl group; said cycloalkylene-diamine is of the formula

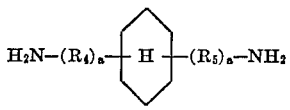

wherein $R_4$ and $R_5$ are straight chain 1–5 carbon atom hydrocarbon groups and $a$ is 0 or 1; said aralkylene-diamine is of the formula

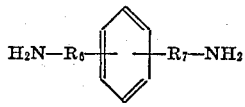

wherein $R_6$ and $R_7$ are 1–5 carbon atom divalent straight chain hydrocarbon groups; said polyalkylene-polyamine is of the formula

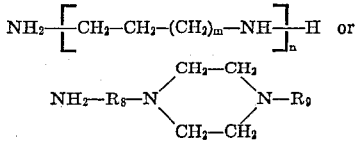

where $m$ is 0 or 1 and $n$ is 2–11 and wherein $R_8$ is a 1–3 carbon atom alkylene group and $R_9$ is hydrogen or a 1–3 carbon atom alkyl group.

5. A lubricating oil composition according to claim 4 wherein said hydroxyalkyl-substituted polyamine is prepared by reacting polyisobutylene epoxide with tetra-ethylene pentamine.

6. A lubricating oil composition according to claim 4 wherein said hydroxyalkyl-substituted polyamine is prepared by reacting polyisobutylene epoxide with 1-(2-aminoethyl)-piperidine.

7. A lubricating oil composition according to claim 4 wherein said hydroxyalkyl-substituted polyamine is prepared by reacting polypropylene epoxide with a diamine selected from the group consisting of ethylene-diamine, 1,3-diaminocyclohexane, 2,4-bis($\beta$-amino-t-butyl) - toluene and 4,4'-diaminodiphenylmethane.

8. A lubricating oil composition according to claim 1 further containing zinc dialkylthiophosphate as an antioxidant and polymethacrylate as a V.I. improving and pore-point depressing agent.

9. A lubricating oil composition according to claim 4 in which said hydroxyalkyl-substituted polyamine is contained in the range of 0.1–8% by weight.

References Cited
UNITED STATES PATENTS

| | | | |
|---|---|---|---|
| 3,235,501 | 2/1966 | Waldmann | 252—51.5 R |
| 2,903,427 | 9/1959 | Bidault et al. | 252—51.5 R |
| 3,195,332 | 7/1965 | Ranauto et al. | 252—51.5 R |
| 3,456,013 | 7/1969 | Egan et al. | 252—51.5 R |
| 3,464,925 | 9/1969 | Benoit et al. | 252—51.5 R |

WERTEN F. W. BELLAMY, Primary Examiner

U.S. Cl. X.R.

260—268, 570.8, 573